United States Patent Office 2,955,096
Patented Oct. 4, 1960

2,955,096

METHOD OF MAKING OIL EXTENDED SYNTHETIC RUBBER AND CARBON BLACK MASTERBATCHES

Woodrow W. White, Oxford, Conn., assignor to United States Rubber Company, New York, N.Y., a corporation of New Jersey No Drawing. Filed Apr. 26, 1954, Ser. No. 425,732

4 Claims. (Cl. 260—33.6)

This invention relates to an improved method of making masterbatches of synthetic rubber and oil extender and carbon black.

Vulcanizates made from oil extended synthetic rubber and carbon black masterbatches prepared by the present invention show a significantly higher abrasion resistance than similar vulcanizates made from masterbatches prepared in the conventional manner by separately dispersing the oil and carbon black in water with anionic dispersing agents and adding the two dispersions separately to an anionic latex, or mixing the two dispersions before adding to an anionic latex, and then co-coagulating the synthetic rubber, oil and carbon black to form the masterbatch.

According to the present invention, the oil and carbon black are first intimately mixed in the absence of water, and then the mixture of oil and carbon black is dispersed in water with an anionic surface-active agent. The thus prepared oil-carbon black dispersion is mixed with an anionic synthetic rubber latex, and final mix of the synthetic rubber and oil and carbon black is co-coagulated to form the improved masterbatch.

On dispersing the initial oil and carbon black mixture in water with the aid of an anionic surface-active agent, there is produced a two phase system in which the oil coated carbon black particles are dispersed in the water, whereas if the oil and carbon black are separately dispersed in water with an anionic surface-active agent and the dispersions are mixed, there results a three phase system of particles of oil and carbon black separately dispersed in the water similar to the system obtained when the two anionic dispersions are added separately to the latex.

As in conventional practice the processing oil, which is used in amount from 25 to 100 parts per 100 parts of the synthetic rubber, may be one or a mixture of aromatic, naphthenic or asphaltic rubber softening oils. Such softening or processing oils, as is known, may be distilled oil fractions or residual oils from the distillation of petroleum, or distilled oil fractions from the distillation of coal tar. The carbon black, which may be the usual furnace or channel carbon black, is used in conventional amount from 25 to 100 parts per 100 parts of synthetic rubber. The processing oil and carbon black may be intimately mixed, before dispersing in the water, in any convenient manner, as by adding the oil to the carbon black or the carbon black to the oil while agitating, or by spraying or atomizing the oil onto the carbon black as it is being agitated, or by mixing the oil and carbon black in a volatile solvent, or adding the carbon black to a solution of the oil in a volatile solvent and then evaporating the solvent. The ratio of oil to carbon black in the mixture will be the same as that desired in the final masterbatch, viz. from 1:4 to 4:1.

The concentration of processing oil and carbon black in the dispersion prepared from the mixture of the oil and black is not critical, usually concentrations of 10 to 30% of the oil-carbon black mixture being used. The amount of anionic surface-active agent used in preparing the aqueous dispersion of the oil-carbon black mixture is not critical and will generally be from ½ to 10 parts per 100 parts of the oil-carbon black mixture. The amount of anionic surface-active agent in the synthetic rubber latex will generally be from 3 to 10 parts per 100 parts of synthetic rubber in the latex. The concentration of synthetic rubber in the latex will generally be from 20% to 60%.

The polymerizable material in the preparation of the anionic rubber latex may be one or a mixture of butadienes-1,3, for example, butadiene-1,3, 2 methyl butadiene-1,3 (isoprene), piperylene, 2,3-dimethyl butadiene-1,3. The polymerizable material, as is known, may be a mixture of one or more such butadienes with one or more polymerizable compounds which are capable of forming rubber copolymers with butadienes-1,3; for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of such monoolefines containing a terminal methylene ($CH_2=C<$) group and are copolymerizable with butadienes-1,3, are aryl olefines, such as styrene, vinyl naphthylene; alpha methyl styrene, para chloro styrene, dichloro styrene, alpha methyl dichloro styrene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidine chloride; vinyl pyridine, 2-methyl-5-vinyl pyridine, vinyl carbazole. Such a synthetic rubber latex may generically be termed a "butadiene polymer synthetic rubber latex."

The anionic surface-active agents that may be used for preparing the latex or for dispersing the mixture of processing oil and carbon black are those having a general formula selected from the group consisting of R—COOM, R—$SO_3M$, and R—O—$SO_3M$, where M represents alkali-metal, ammonium or substituted ammonium (amine) radical, and R represents an organic radical containing at least one group having more than 8 carbon atoms. Examples of such anionic surface-active agents are:

(1) Soaps (e.g., sodium laurate, ammonium stearate, diethanol ammonium oleate, sodium or potassium soaps of rosin acids or of disproportionated rosin acids or of dehydrogenated rosin acids).

(2) Alkyl sulfonates (e.g., dodecyl sodium sulfonate, cetyl potassium sulfonate).

(3) Alkyl sulfates (e.g., sodium dodecyl sulfate, sodium oleyl sulfate).

(4) Sulfonated ethers of long and short chain aliphatic groups (e.g., $C_{17}H_{33}$—O—$C_2H_4$—$SO_3$—Na).

(5) Sulfated ethers of long and short chain aliphatic groups (e.g., $C_{17}H_{33}$—O—$C_2H_4$—O—$SO_3Na$).

(6) Sulfonated alkyl esters of long chain fattty acids (e.g.,

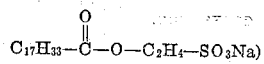

(7) Sulfonated glycol esters of long chain fatty acids (e.g.,

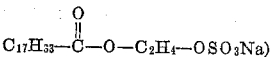

(8) Sulfonated alkyl substituted amides of long chain fatty acids (e.g.,

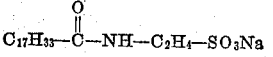

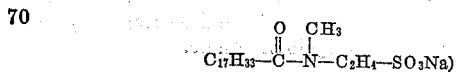

(9) Alkylated aryl sulfonates (e.g., isopropyl naphthalene sodium sulfonate, dodecyl benzene sodium sulfonate).

(10) Hydroaromatic sulfonate (e.g., tetrahydronaphthalene sodium sulfonate).

(11) Alkyl sulfosuccinates (e.g., dioctyl sodium sulfosuccinate).

(12) Aryl sulfonate-formaldehyde condensation products (e.g., condensation product of formaldehyde and sodium naphthalene sulfonate

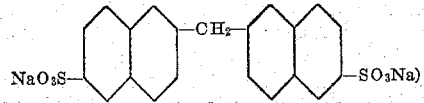

The following examples illustrate the present invention. All parts and percentages referred to herein are by weight. In the laboratory, the abrasion resistance rating of a given rubber compound is generally measured by comparing the volume loss with the volume loss from a standard sample under the same abrading conditions. A modified Lambourn abrader, which is a constant slip type abrader, as described by J. W. Adams, et al. in the article "Abrasion Resistance of GR–S Vulcanizates" in Rubber Chemistry and Technology, 25, 191–208 (April–June 1952), was used in all the abrasion tests referred to herein with the amount of slip between the sample wheel of the compound under test and the abrasive wheel controlled to 24±1 percent. As discussed in the Adams et al. article, the abrasion resistance ratings are calculated by the following formula to bring them in line with reported tire tread wear ratings:

$$\text{Abrasion resistance rating} = \frac{200 \, V_s}{V_a + V_s}$$

where:

$V_s$ = volume abrasion loss of standard
$V_a$ = volume abrasion loss of vulcanizate rated.

As may be seen, the smaller the abrasion loss and the higher the abrasion resistance rating, the better is the abrasion resistance of the vulcanizate.

*Example I*

The synthetic rubber latex was made according to the formula:

| | Parts by weight |
|---|---|
| Butadiene | 75 |
| Styrene | 25 |
| Potassium soap of disproportioned abietic acid | 4.0 |
| Sodium salt of condensation product of formaldehyde and naphthalene sulfonic acid | 0.1 |
| Potassium hydroxide | 0.05 |
| Trisodium phosphate | 0.3 |
| Mixed tertiary mercaptan ($C_{12}$, $C_{14}$ and $C_{16}$) | 0.11 |
| Cumene hydroperoxide | 0.12 |
| Ferrous sulfate | 0.20 |
| Potassium pyrophosphate | 0.20 |
| Water | 200. |
| Potassium dimethyl dithiocarbamate* | 0.15 |

* Added as a shortstop after polymerization, polymerized at 41° F. to 60% conversion.

The latex polymer had a raw Mooney viscosity of 150. Mooney viscosities referred to herein the ML–4 measurements at 212° F.–A.S.T.M. Standard on Rubber Products D–927–52T. High Mooney latices, i.e., having a raw Mooney viscosity in the range of 75 to 200 are generally used in preparing masterbatches according to the present invention.

Fifty parts of a naphthenic processing oil (Circosol 2 XH) was gradually added to 75 parts of a high abrasion furnace black (Philblack O) with agitation. The oil-carbon black mixture was dispersed by agitating in 305 parts of water containing 0.3 part of sodium hydroxide and 1.4 parts of oleic acid and 3 parts of partially desulfonated sodium lignin sulfonate.

The oil-carbon black dispersion was added to the GR–S latex in the proportion of 125 parts of solids of the dispersion (50 parts of oil and 75 parts of carbon black) to 100 parts of rubber of the latex. The mixture was coagulated, washed and dried in the usual manner to give masterbatch A according to the present invention.

The same composition of oil-synthetic rubber-carbon black masterbatch was conventionally prepared by separately mixing with an amount of the above latex containing 100 parts of rubber an emulsion of 50 parts of the Circosol 2 XH processing oil in 47.5 parts of water, and 1.4 parts of oleic acid, and 0.2 part of sodium hydroxide and a dispersion of 75 parts of Philblack O carbon black in 297 parts of water and 0.3 part of sodium hydroxide and 3 parts of partially desulfonated sodium lignin sulfonate, coagulating, washing and drying to give the conventional control masterbatch B.

The oil-synthetic rubber-carbon black masterbatch B made by the conventional procedure and masterbatch A made by the process of the present invention were compounded according to the following recipe:

| | Parts by weight |
|---|---|
| Softener-black masterbatch | 440 |
| Zinc oxide | 6.75 |
| Sulfur | 4.5 |
| Benzothiazyl disulfide | 2.9 |
| Diphenyl guanidine | 1.1 |
| Acetone-diphenylamine antioxidant | 1.5 |

The compounded Mooney viscosities of samples A and B were 55 and 43, respectively. Test samples and test wheels were made from the above compounds, vulcanized for various times at 292° F., and unaged stress-strain properties and abrasion resistance ratings were determined. The test wheels were cured ten minutes longer than the corresponding stress-strain test samples because the wheels were loaded in cold molds, and the ten extra minutes were to compensate for the period of warming up the mold and test wheels to curing temperature.

The results of the tests are shown in the following table:

| Test | Curing Time of Test Sample, min. | Compound Made from Masterbatch | |
|---|---|---|---|
| | | A | B |
| Stress-Strain at Room Temp., 300% Modulus, p.s.i. | 25 | 1,160 | 890 |
| | 50 | 1,130 | 1,190 |
| | 100 | 1,580 | 1,240 |
| Tensile strength, p.s.i. | 25 | 3,000 | 2,940 |
| | 50 | 2,850 | 2,900 |
| | 100 | 2,930 | 2,910 |
| Elongation, percent | 25 | 600 | 700 |
| | 50 | 580 | 570 |
| | 100 | 490 | 550 |
| Abrasion Loss (cc. per 3,000 ft.) | 60 | 0.082 | 0.147 |
| | 110 | 0.111 | 0.150 |
| Abrasion Resistance Rating | 60 | 127 | [1] 100 |
| | 110 | 119 | [1] 100 |
| Average | | 123 | [1] 100 |

[1] Control for rating.

*Example II*

In this case, masterbatches were made from the latex of Example I containing 100 parts of rubber of the latex, 40 parts of Circosol 2 XH processing oil and 77 parts of Philblack O carbon black. In masterbatch C, made according to the present invention, the 40 parts of oil was atomized onto the carbon black as it was being agitated and the oil-carbon black mixture was then dispersed with anionic surface-active agents similarly to masterbatch A in Example I, and the dispersion of the oil-carbon black mixture added to the latex. In masterbatch D made according to the present invention, the 40 parts of oil was dissolved in 150 parts of petroleum ether, the solvent solution of oil was then mixed with the carbon black, and the solvent was evaporated to give the intimate mixture of the oil and carbon black. The thus prepared oil-carbon black mixture was then dispersed with anionic surface-active agents similarly to masterbatch A in Example I, and the dispersion of the oil-carbon black mixture added to the latex. The control masterbatch E was made by adding separately prepared anionic dispersions of the oil and carbon black to the latex similar to the dispersions in Example I in making masterbatch B. In all cases, the oil and synthetic rubber and carbon black were co-coagulated with salt (NaCl) and sulfuric acid, washed and dried as in conventional practice.

The masterbatches C, D and E were compounded according to the recipe in Example I, and test pieces and test wheels were made from the compounds. The compounded Mooney viscosities of samples C, D and E were 61, 63.5 and 70, respectively. The test pieces and test wheels were vulcanized at 292° F. for various times, and stress-strain properties and abrasion resistance ratings were determined.

The results of the tests are shown in the following table:

| Test | Curing Time of Test Sample, min. | Compound Made from Masterbatch | | |
|---|---|---|---|---|
| | | C | D | E |
| Stress-Strain at Room Temp., 300% Modulus, p.s.i. | 25 | 1,340 | 1,290 | 1,190 |
| | 50 | 1,650 | 1,580 | 1,590 |
| | 100 | 1,600 | 1,650 | 1,710 |
| Tensile Strength, p.s.i. | 25 | 2,970 | 3,060 | 2,510 |
| | 50 | 3,040 | 2,950 | 2,760 |
| | 100 | 3,030 | 2,940 | 2,740 |
| Elongation, percent | 25 | 590 | 610 | 550 |
| | 50 | 490 | 500 | 480 |
| | 100 | 490 | 490 | 450 |
| Abrasion loss (cc. per 3,000 ft.) | 35 | 0.068 | 0.073 | 0.092 |
| | 60 | 0.075 | 0.047 | 0.120 |
| | 110 | 0.098 | 0.136 | 0.098 |
| | 150 | 0.073 | 0.067 | 0.090 |
| Abrasion Resistance Rating | 35 | 115 | 108 | [1]100 |
| | 60 | 122 | 143 | [1]100 |
| | 110 | 100 | 84 | [1]100 |
| | 150 | 110 | 114 | [1]100 |
| Average | | 112 | 112 | [1]100 |

[1] Control for rating.

As may be seen from the results in the above table, the method of the present invention resulted in masterbatches having 200 to 300 p.s.i. (pounds per square inch) higher tensile strengths and significantly better abrasion resistance ratings than obtained for a similar masterbatch prepared by conventional methods.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of preparing an oil-carbon black synthetic rubber masterbatch which comprises intimately mixing the oil and carbon black in the absence of water, dispersing the thus prepared oil and carbon black mixture in water with an anionic dispersing agent to form an anionic dispersion of oil-coated carbon black particles, mixing the thus formed oil-carbon black dispersion with an anionic butadiene polymer synthetic rubber latex, and co-coagulating the synthetic rubber and oil and carbon black.

2. The method of claim 1 in which the synthetic rubber is a copolymer of a major proportion of butadiene-1,3 and a minor proportion of styrene.

3. The method of claim 1 in which the amount each of oil and carbon black used is 25 to 100 parts per 100 parts of synthetic rubber in the latex.

4. The method of claim 2 in which the amount each of oil and carbon black used is 25 to 100 parts per 100 parts of synthetic rubber in the latex.

References Cited in the file of this patent

McMillan et al.: "Rubber Age," volume 66, No. 6, March 1950, pages 663–666.

D'Ianni et al.: "Rubber Age," June 1951, pages 317–321.

"The Rubber Age and Synthetics," volume 32, No. 6, August 1951, pages 197–200.